Dec. 17, 1940.                M. VOGEL                2,224,995
VANITY CASE OR COMPACT
Filed Nov. 13, 1937
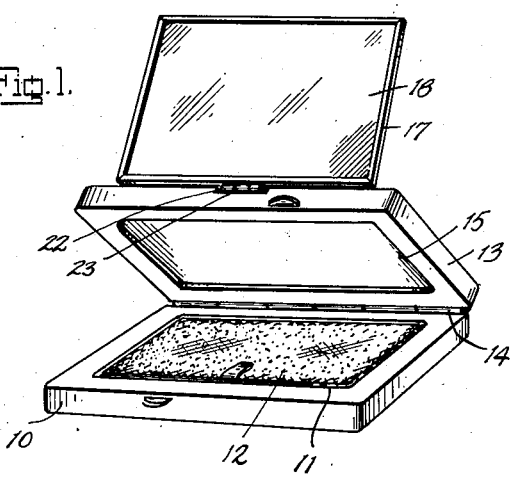
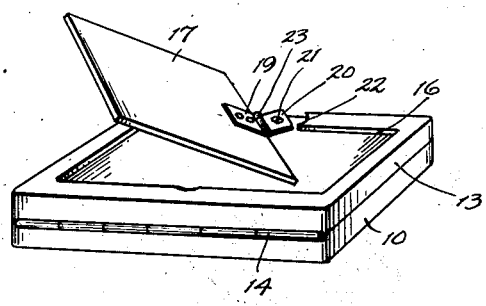
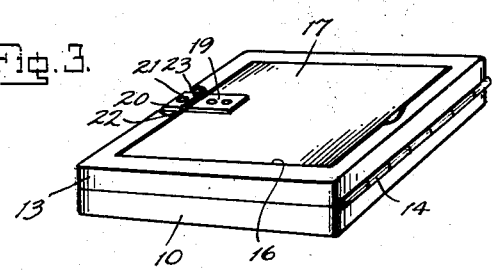
INVENTOR
Max Vogel
BY
ATTORNEY Patented Dec. 17, 1940

2,224,995

UNITED STATES PATENT OFFICE 2,224,995

VANITY CASE OR COMPACT

Max Vogel, Bridgeport, Conn.

Application November 13, 1937, Serial No. 174,467
In Switzerland April 10, 1937

1 Claim. (Cl. 88—103)

The present invention relates to an improved vanity case or compact and has for an object to provide such a case for containing the usual powder, rouge and powder puff and in which the mirror is arranged in such manner that it will be protected against contact with the powder, and may be adjusted in the most convenient manner to enable the user to have full use of both hands and to be located as regards angle and light so as to obtain the best reflected image. Obviously the invention may be incorporated in other types of cases as razor cases, toilet kits, etc.

In the usual type of compact heretofore in use the mirror has been provided upon the inside of the cover, so that while the compact is closed it is constantly smudged by the powder, and before it can be used must be wiped off.

While attempts have been made to provide automatic means for wiping or cleaning the mirror as the compact is opened, such means have been complicated and would not insure satisfactory cleaning. Also automatic means have been provided for covering the mirror provided within the compact as the compact was closed, but this has the objection of complication and unsatisfactory cleaning.

With these previous compacts, with the mirror provided upon the inside, it is necessary in order to hold the mirror at the desired angle to also move the powder compartment, with the result that the powder is apt to spill when the compartment is moved out of a horizontal position. Also in order to use the mirror it is necessary to bring the face close to the powder compartment so that the user's breath is apt to disperse the powder. In order to use a mirror conveniently it is desirable that it be placed at an angle of more than 90°, and with these previous types of compacts with the mirror inside the cover, it is not possible to place the mirror at such an angle while the compact remains horizontal upon the table or other support without overbalancing the compact, and causing it to tip over toward the rear due to the weight of the cover.

It is proposed in the present invention to obviate these various disadvantages, and to this end the invention contemplates arranging the mirror upon the outside of the compact in such relation that the mirror surface will be normally enclosed within a suitable recess when not in use, and may be swung into any desired angular position when in use, this position being entirely independent of the position of the lower part of the compact. It is further proposed to mount the mirror upon the hinged cover of the compact so that the base may remain horizontal upon a suitable support and the cover opened to any desired angular position to raise the mirror, the mirror then being adjustable to the desired angle. In this manner the height of the mirror may be increased above the support by the width of the cover. It is further proposed to mount the mirror upon a universal hinge member whereby it can both swivel and tilt to any desired angular relation.

With the above and other objects in view, an embodiment of the invention is shown in the accompanying drawing, and this embodiment will be hereinafter more fully described with reference thereto, and the invention will be finally pointed out in the claim.

In the drawing:

Fig. 1 is a perspective view showing the compact according to the illustrated exemplary embodiment of the invention, with the cover open and with the mirror tilted upwardly to the desired angular position for use.

Fig. 2 is a perspective view showing the cover of the compact closed, and with the mirror in position to be folded into the recess provided for it in the cover.

Fig. 3 is a perspective view showing the compact closed with the mirror closed within its recess.

Similar reference characters indicate corresponding parts throughout the several figures of the drawing.

Referring to the drawing, the compact body, shown by way of example is of the usual construction consisting of a base 10 having a recess 11 for containing powder, rouge, or the like and in which is also disposed the powder puff 12. The cover 13 is hinged to the base 10 by means of a hinge 14 which is of a type to frictionally retain the cover in its moved position, this cover being provided upon its inner face with a recess 15 opposed to the recess 11 for receiving the upper surface of the puff 12. The cover and base may be provided with any suitable catch means.

In the upper surface of the top there is provided a recess 16 within which the mirror, consisting of the mirror backing frame 17 and the mirror glass 18, is adapted to engage in flush relation with the mirror backing frame 17 exposed as shown in Fig. 3, so that it is continuous with the marginal surface of the top. By providing the backing frame with a contrasting design, color, or material it will be seen that the arrangement lends itself to enhancing the ornamental appearance of the compact.

The mirror has secured adjacent one edge one member 19 of a hinge element, the other member 20 being pivotally secured to the top 13 by means of a pin 21, this pin being disposed in a recess 22 provided in the marginal portion of the top surrounding the recess 16, the recess 22 being flush with the recess 16 and its walls being concentric to the pin 21, so that the hinge member 20 may have free swivelling movement within said recess 22. The hinge joint 23 of the hinge element is of a type that will frictionally retain the mirror in any angular position to which it is moved.

It will be seen from Fig. 3 that when the compact is not in use the mirror surface is closed within the recess 16 at the outer side of the top, so that it is entirely protected against contact with powder. When it is desired to use the same it may be swung into open position, either with the top closed, upon such occasions when it is not desired to use the powder, or with the top open as shown in Fig. 1. In this latter position the base may remain horizontal upon a suitable support and the cover and mirror moved to any desired angular position. By its arrangement upon the forward edge of the cover the mirror may be brought very close to the face. The top may be angularly adjusted to raise or lower the mirror, and the mirror may be angularly adjusted both about the hinge 23 and about the pin 21 to bring it into the most desirable position from the standpoint of light and angle. In order to use the mirror it is unnecessary to bring the compact itself close to the face, as is necessary with the usual type of compact having the mirror at the inner side of the cover, so that the powder can be more conveniently removed and the chance of dispersing it by the user's breath is obviated.

While I have shown the mirror arranged within a recess in the top of the cover it will be understood that it can if desired be arranged within a suitable pocket in the cover from which it can be pulled or swung out to expose it, in which case the hinge is mounted upon a suitable rail or lever.

While I have shown the compact as of rectangular shape, it will be understood that it can be made round, oval, or any other desired shape.

I have illustrated and described a preferred and satisfactory embodiment of the invention, but it will be understood that changes may be made therein, within the spirit and scope thereof, as defined in the appended claim.

Having thus described my invention, what I claim and desire to secure by Letters Patent is:

In a powder compact, a powder container comprising a receptacle and an imperforate cover hinged to said receptacle and having a recess in its outer surface, a mirror element having a mirror surface at one side and a non-mirror surface at its other side, and normally fitting into said recess with its mirror surface facing downwardly to enclose and protect it, and a swivelling hinge connection between said mirror element and said cover connected to said cover centrally of its edge opposite from its hinge connection with said receptacle, said swivelling hinge connection permitting the mirror element to be swung out of said recess and rotated to cause its mirror surface to face in the same direction as the open side of said receptacle when said cover is raised into open position, and in which open position said cover constitutes a powder deflecting shield between said receptacle and said mirror surface, said receptacle adapted to act as a supporting stand with respect to which said cover and mirror element are adjustable.

MAX VOGEL.